United States Patent [19]

Beyer

[11] Patent Number: 4,877,826
[45] Date of Patent: Oct. 31, 1989

[54] WEATHERABLE STYRENIC POLYMER BLEND COMPRISING POLYALKYLENE GLYCOL

[75] Inventor: Douglas E. Beyer, Midland, Mich.

[73] Assignee: The Dow Chemical Company, Midland, Mich.

[21] Appl. No.: 254,176

[22] Filed: Oct. 5, 1988

[51] Int. Cl.$^4$ ............................................... C08K 5/06
[52] U.S. Cl. ................................................... 524/377
[58] Field of Search .................. 525/71, 73, 74, 84; 524/377

[56] References Cited

U.S. PATENT DOCUMENTS

| | | | |
|---|---|---|---|
| Re. 28,070 | 7/1974 | Brindell et al. | 524/377 |
| Re. 32,733 | 8/1988 | Simroth et al. | 524/377 |
| 3,450,794 | 6/1969 | Ebneth et al. | 524/377 |
| 3,489,821 | 1/1970 | Witt et al. | 525/75 |
| 3,576,910 | 4/1971 | Jastrzebski | 525/86 |
| 3,652,726 | 3/1972 | Nield et al. | 525/67 |
| 4,223,096 | 9/1080 | Lee et al. | 525/74 |
| 4,404,322 | 9/1983 | Saito et al. | 525/74 |
| 4,433,102 | 2/1984 | Brandstetter et al. | 524/377 |
| 4,474,919 | 10/1984 | Lobos et al. | 524/377 |
| 4,585,832 | 4/1986 | Kokubo | 525/71 |
| 4,757,109 | 7/1988 | Kishida | 525/73 |
| 4,766,175 | 8/1988 | Henton | 525/84 |

Primary Examiner—Veronica P. Hoke
Attorney, Agent, or Firm—Douglas N. Deline

[57] ABSTRACT

Improved plasticization and stabilization of poly(styrene-acrylonitrile)/grafted diene rubber blends is obtained by use of polyalkylene glycol stabilizers.

20 Claims, No Drawings

WEATHERABLE STYRENIC POLYMER BLEND COMPRISING POLYALKYLENE GLYCOL

BACKGROUND OF THE INVENTION

The present invention relates to rubber reinforced styrenic polymer resins More particularly, the present invention relates to such rubber reinforced resins having improved weather resistance and physical characteristics. In one embodiment, the present invention relates to an improved weatherable rubber reinforced styrene-acrylonitrile resin.

It is previously known in the art to prepare rubber modified resins wherein the rubber comprises a grafted copolymer of ethylene, propylene and optionally a copolymerizable diene monomer. Such rubbers are known as EPDM rubbers. In U.S. Pat. No. 3,489,821 a blend comprising an EPDM graft terpolymer and a hard matrix resin is disclosed. At Col. 7, line 31, the reference teaches that the graft copolymer resin blend may be mixed with other resins and/or rubbers In U.S. Pat. No. 3,576,910, there is disclosed an ABS polyblend comprising a matrix copolymer of styrene and acrylonitrile and grafted rubbers wherein the grafted superstrate consists at least principally of a monovinylidene aromatic hydrocarbon and an unsaturated nitrile, i.e., styrene acrylonitrile copolymer. Suitable rubbers for use in the polyblend include diene rubbers, acrylate rubbers, polyisoprene rubbers and mixtures thereof.

U.S. Pat. No. 4,585,832 disclosed weather and impact resistant resins containing both a grafted acrylate rubber and a different grafted rubber. The second rubber could be either an EPDM rubber or a diene based rubber. Amounts of acrylate rubber from 60 to 97% based on total grafted rubber weight were employed.

In U.S. Pat. No. 4,397,987 a polyblend comprising a nitrile rubber and an EPDM graft rubber was disclosed. In Table 9, Col. I, a blend of an ungrafted EPDM rubber and HYCAR 4041, an acrylate rubber, was prepared.

Organic polymeric materials are subject to thermal, oxidative and ultraviolet light degradation which exhibits itself in the loss of physical properties in the resin and in change of color. Generally resins containing rubbers with residual unsaturation are extremely sensitive to such degradation. Resins containing EPDM, acrylate or other saturated rubbers are generally more resistant to such degradation and are referred to as weatherable resins. Nevertheless a certain amount of resin degradation may still occur upon exposure to ultraviolet light even for such weatherable resins. Therefor, it is generally necessary to incorporate into polymeric materials certain stabilizers which retard the above decomposition and discoloration. A variety of compounds have been employed for that purpose including the well-known hindered phenols, hindered amines, benzotriazoles, phosphorus esters, and polyalkyl thiobenzenes disclosed in U.S. Pat No. 4,163,006.

In addition to additives used to inhibit polymer degradation as above described, different additives to improve polymer processing properties may also be incorporated into organic polymeric materials. Examples include plasticizers which are generally introduced into a polymer in order to reduce the glass transition temperature thereof and to promote improved stress relaxation characteristics. In *Modern Plastics Encyclopedia*, Vol. 64, No. 10A, October 1987, at page 168, suitable general purpose plasticizers are said to include the phthalate esters of higher alcohols and diols: trialkyl trimellitates; polymeric polyesters: epoxidized soybean oil: monomeric esters of aliphatic dicarboxylic acid: polyesters of dicarboxylic acids with various glycols; triphenyl phosphate: monomeric esters of aliphatic dicarboxylic acid, for example dialkyl glutarates, adipates: etc. The same reference at page 643 discloses that the various molecular weight polymeric derivatives of ethylene glycol are suitable plasticizers for use in cellulose nitrate polymers.

SUMMARY OF THE INVENTION

According to the present invention it has now been discovered that low molecular weight polyalkylene glycols may be added to weatherable rubber modified styrenic polymers to provide both good plasticization of the resulting polymer and in addition to provide improved weatherability. In particular discoloration upon exposure of the resin to ultraviolet radiation is significantly reduced. Accordingly, there is now provided a method of stabilizing a weatherable molding resin comprising a) a matrix comprising a copolymer of styrene, acrylonitrile and from 0 to 50 weight percent methylmethacrylate, N-phenylmaleimide, N-$C_{1-4}$ alkyl maleimide, maleic anhydride or mixtures thereof and b) an impact modifying quantity of a grafted EPDM rubber, grafted alkylacrylate rubber or a mixture thereof, the method comprising incorporating into the resin an amount of a polyalkylene glycol sufficient to reduce resin discolorization upon exposure to weathering conditions.

In another embodiment of the present invention there is additionally provided a composition comprising (A) a matrix polymer selected from the group consisting of copolymers of styrene and acrylonitrile and from 0 to 50 percent based on monomer weight of a monomer selected from the group consisting of methylmethaorylate, N-phenylmaleimide, N-$C_{1-4}$ alkylmaleimides, maleic anhydride, and mixtures thereof; (B) an impact modifying quantity of a grafted rubber selected from the group consisting of EPDM and acrylate rubbers having grafted thereto in polymerized form styrene, acrylonitrile, and from 0 to 50 percent by weight based on monomer weight of methylmethacrylate, N-phenylmaleimide, $C_{1-4}$ alkylmaleimide, maleic anhydride, or mixtures thereof: and (C) an amount of a polyalkylene glycol sufficient to reduce resin discolorization upon exposure to weathering conditions.

DETAILED DESCRIPTION OF THE INVENTION

The styrenic polymers suitably employed in the present invention and the techniques for their preparation are previously well-known in the art. Preferred compositions are the well-known AES polymers comprising copolymers of styrene and acrylonitrile containing impact modifying quantities of a grafted EPDM rubber. Examples of the foregoing are disclosed in U.S. Pat. No. 3,489,821 the teachings of which are incorporated herein by reference thereto. Further preferred styrenic resins include the foregoing class of AES resins additionally comprising a minor quantity of a grafted acrylate rubber. Such compositions are disclosed in the aforementioned U.S. Pat. No. 4,585,832 the teachings of which additionally are incorporated herein by reference thereto, and in copending applications, Ser. Nos.

232,268 filed Aug. 15, 1988 and 224,523 filed July 26, 1988.

In one embodiment of the present invention, the matrix copolymer is prepared during the polymerization process used to graft the EPDM and/or acrylate elastomers. Additional separately prepared matrix of the same or different composition can also be produced and blended with the rubber containing resins so prepared. Preferred are matrix copolymers comprising from 65 to 90 percent by weight monovinylidene aromatic monomer, 10 to 35 percent by weight acrylonitrile and 0 to 20 percent by weight methylmethacrylate. A most preferred matrix copolymer comprises 70 to 85 percent styrene and 15 to 30 percent acrylonitrile.

The elastomer phase of the above described composition desirably comprises from about 15 to 30 percent by weight thereof. Preferred compositions are those wherein the elastomer comprises both an EPDM graft rubber and an acrylate graft rubber. EPDM rubbers employed to prepare the graft elastomers for use in the present invention and techniques for their preparation are well-known in the art. One suitable description and a means for the preparation is provided in the previously cited U.S. Pat. No. 3,489,821. Additional teachings are contained in U.S. Pat. No. 4,202,948 the teachings of which are incorporated herein by reference thereto. While a variety of alpha monoolefins may be used in preparing EPDM rubbers, most desirably the elastomers comprise a terpolymer of ethylene, propylene and an ethylenically unsaturated copolymerizable nonconjugated diene monomer. The illustrative nonlimiting examples of the latter include dicyclopentadiene, ethylidene norbornene and hexadiene.

Suitable techniques for preparing the graft copolymers of EPDM rubbers are also well-known in the art. Either a solution, suspension, emulsion, or other suitable technique may be employed. Preferred grafted EPDM rubbers have a volume average particle size from 0.5 microns to 5.0 microns.

The acrylate rubbers suitable for grafting and use according to the present invention are also previously well-known in the art and described for example, in U.S. Pat. Nos. 3,830,878: 4,341,883: 3,944,631; 3,691,260; and 4,224,419 the teachings of which are incorporated herein by reference thereto. Preferred acrylate rubbers are cross-linked homopolymers of $C_{1-8}$ alkylacrylates, especially such cross-linked homopolymers of butylacrylate or 2-ethylhexyl acrylate, and cross-linked copolymers of such monomers with up to about 25 weight percent preferably up to about 10 weight percent of a copolymerizable comonomer. Suitable copolymerizable comonomers include monovinylidene aromatic monomers, acrylonitrile, and methylmethacrylate. Suitable cross-linking monomers include various di and tri vinyl substituted cross-linking and graft enhancing agents, especially di-allyl acrylate, allyl methacrylate, trimethylol triacrylate, divinylbenzene, etc. Suitably such cross-linking and graft enhancing agents are employed in an amount up to about 5 percent by weight based on total acrylate monomer weight.

Preferably the acrylate rubbers is prepared by an emulsion process. Emulsion polymerized acrylate rubbers when employed may be partially agglomerated as is previously known in the art in order to provided greater variety of particle size distribution in the resulting acrylate rubber product thereby controlling gloss and impact properties of the resin. The rubber particles can also be grown to various sizes by varying the polymerization conditions and/or a mixture of previously prepared large and small seed particles may be employed to form the grafted rubber.

Grafting of the acrylate rubber is accomplished according to techniques that are similar to those employed in the preparation of grafted EPDM rubbers. Suitably, emulsion, suspension, or solution processes may be employed. Preferably, the grafted acrylate rubber is prepared by an emulsion polymerization. The grafted acrylate rubbers volume average particle diameter is preferably from about 0.05 microns to about 0.5 microns, most preferably from about 0.1 micron to about 0.25 microns. The volume average particle diameters are suitable measured in latex form before grafting using techniques of transmission electron microscopy or hydrodynamic chromotography as disclosed in U.S. Pat. No. 4,419,496. Suitable techniques for preparing such grafted acrylate rubbers are taught in U.S. Pat. Nos. 3,830,878: 4,341,893: 3,944,631; 3,691,260: and 4,224,419 the teachings of which are incorporated herein by reference thereto.

The amount of grafting in both the EPDM and acrylate rubbers may vary over wide ranges. As defined by percent grafting (attached rigid phase weight divided by rubber weight times one hundred) the percent graft may be from about 5 to about 150. Preferred percent grafting limits are from about 10 to about 100. Generally, larger sized rubber particles possess lesser amount of graft copolymer on a percentage basis. The various graft copolymers and matrix copolymer need not be identical provided that the same are mutually compatible. Preferably if two or more rubber substrates are employed they are grafted with graft copolymers comprising the same monomer components which further are the same monomer components of the matrix resin. Most preferably the weatherable rubber components have graft copolymers comprising in polymerized form styrene, acrylonitrile, and from 0 to 50 percent by weight based on monomer weight of methylmethacrylate, N-phenylmaleimide, $C_{1-4}$ alkylmaleimide, maleic anhydride, or mixtures thereof.

By means of an appropriate selection of the elastomer particle size, amount of cross-linking and the total amount of EPDM and acrylate rubber used in the compositions of the invention, resins having a wide variety of product properties may be prepared. Preferred compositions are those wherein from 85 to 70 percent of the elastomer phase comprises a grafted EPDM terpolymer rubber and 15 to 50 percent of elastomer phase comprises a grafted acrylate rubber.

In addition to the previously described grafted acrylate and EPDM rubbers, the present invented composition may optionally comprise other saturated elastomeric components including but not limited to vinyl acetate rubbers; hydrogenated diene rubbers; e.g. hydrogenated polybutadiene, or hydrogenated block copolymers of butadiene with monovinylidene aromatic monomers; and chlorinated polyethylenes. Preferably, the elastomer of the present composition consists essentially of grafted EPDM rubber and grafted acrylate rubber.

The polyalkylene glycols suitably employed as both stabilizers and lubricants in the present invention preferably have a molecular weight from 200 to 2,000, most preferably, from 400 to 1,600. A most preferred polyalkylene glycol is polyethylene glycol. The polyalkylene glycol additive is incorporated in an amount sufficient to impart the desired degree of resin stabilization and plasticization. Preferred amounts are from 0.1 to 5.0 percent, preferably 0.5 to 3.0 percent based on total resin weight.

The polyalkylene glycol may be incorporated into the resin blend by any suitable technique. Preferably the polyalkylene glycol is added to a mixture of the resin particles and thereafter fully and homogeneously melt blended by extrusion or other suitable technique.

The compositions of the invention may be employed in the preparation of molded objects such as architectural trim, automotive components and other decorative and structural components. The resin may additionally be combined with quantities of other resins especially aromatic polycarbonates, polyarylethers, polysulfones, polyvinylchloride, polystyrene, and polymethylmethacrylate resins. Additional additives such as colorants, antioxidants, flow aids, antistatic additives, ignition resistant additives, etc. may be included as well.

Having described the invention the following examples are provided as further illustrative and are not to be construed as limiting.

EXAMPLE 1

The sample resin compositions listed in Tables I and II were produced by blending and compounding various resins in an 0.8 inch (2 cm) Welding Engineers extruder. Samples designated EPDM were prepared from a commercial base stock of EPDM rubber modified styrene acrylonitrile copolymer containing 23 percent rubber and 27 percent acrylonitrile in the graft and matrix phases (XU-74053.02 weatherable polymer available from The Dow Chemical Company). Samples designated EPDM/Acrylate contained 85 weight percent of the above described base stock and 15 weight percent of a styrene/acrylonitrile emulsion grafted butylacrylate rubber resin contained 45 weight percent rubber having an elastomeric core of n-butyl acrylate containing 0.5 percent allyl methacrylate crosslinker and an outer shell containing 0.2 percent trimethylol triacrylate graft linker. The specific additive and use level in percent by weight are shown in Tables I and II.

Table I shows the results of stress relaxation measurements. Such measurements demonstrate the plasticizing effectiveness of a compound. Measurements are made by measuring the time for strain induced stress to decay to ½ of a maximum value at 95° C. Stress is measured on ½"×⅛"×2.5" (1.27 cm×0.3 cm×6.3 cm) specimens using a Rheometrios ® Dynamic Mechanical Spectrometer. A low value for the stress relaxation half life is most desirable. Polyethylene glycol demonstrates a clear advantage in stress relaxation half life when compared to a selection of typical plasticizing additives.

Table II shows sample yellowing upon Xenon Arc exposure which is a good laboratory measure of weathering stability. The values shown are the change in sample color according to a standard color measurement technique (CIE b value) between 200 and 3,000 hours of exposure. A low or slightly negative value is most desirable. Again, the polyethylene glycol demonstrates significantly superior performance when compared to a selection of typical plasticizing additives.

TABLE I

| Additive (amount) | Stress Relaxation half life, sec. | | |
|---|---|---|---|
| | EPDM (1%) | EPDM (2%) | EPDM/ Acrylate (2%) |
| Polyethylene glycol - 600 mw | 5 | 0.5 | 0.2 |
| Oleic acid* | 13 | 4 | 24 |
| Triphenylphosphate* | 14 | 4 | 4 |
| Mold Wiz INT-332A7* | 27 | 13 | 12 |
| Butyl benzyl phthalate* | 9 | 3 | 2 |
| Unplasticized control* | 38 | | 31 |

*Comparative

TABLE II

| Additive (amount) | Change in sample colon (cleb value) | | |
|---|---|---|---|
| | EPDM (1%) | EPDM (2%) | EPDM/ Acryalte (2%) |
| Polyethylene glycol - 600 mw | 0.5 | 0.1 | −0.1 |
| Oleic acid* | 3.7 | 4.0 | 2.9 |
| Triphenylphosphate* | 3.7 | 3.9 | 3.1 |
| Mold Wiz INT-332A7* | 5.7 | 8.0 | 6.3 |
| Butyl benzyl phthalate* | 3.6 | 3.6 | 2.0 |
| Dioctyl Adipate* | 2.2 | 2.2 | 1.5 |
| Unplasticized control* | 3.4 | | 3.6 |

*Comparative

As may be seen by review of the above results of the additives tested, the polyethylene glycol having a molecular weight of 600 was more effective than any other composition in providing resin stress relaxation and reduced color formation. Thus in a weatherable resin these additives provide unique benefits of resin plasticization and polymer stabilization.

What is claimed is:

1. A method of stabilizing a weatherable molding resin comprising (a) a matrix comprising a copolymer of styrene, acrylonitrile and from 0 to 50 weight percent methylmethacrylate, N-phenylmaleimide, N-$C_{1-4}$ alkyl maleimide, maleic anhydride or mixtures thereof and (b) an impact modifying quantity of a grafted EPDM rubber, grafted alkylacrylate rubber or a mixture thereof, the method comprising incorporating into the resin an amount of a polyalkylene glycol having a molecular weight from 200 to 2,000, said amount being sufficient to plasticize said molding resin and to reduce resin discoloration upon exposure to weathering conditions.

2. A method according to claim 1 wherein the polyalkylene glycol is polyethylene glycol.

3. A method according to claim 2 wherein the polyethylene glycol has a molecular weight from 400 to 1,600.

4. A method according to claim 1 wherein the molding resin is a styrene-acrylonitrile copolymer containing both grafted EPDM and grafted alkylacrylate rubbers.

5. The method of claim 1 wherein the polyalkylene glycol constitutes from 0.1 to 5.0 percent of the total weight of said molding resin.

6. The method of claim 1 wherein the polyalkylene glycol constitutes from 0.5 to 3.0 percent of the total weight of said molding resin.

7. The method of claim 1 wherein said molding resin comprises a grafted EPDM rubber having a volume average particle size of from 0.5 to 5.0 microns.

8. The method of claim 1 wherein said molding resin comprises both a grafted EPDM rubber and a grafted acrylate rubber.

9. The method of claim 8 wherein the grafted EPDM rubber has a volume average particle size of from 0.5 to 5.0 microns and wherein the grafted acrylate rubber has a volume average particle diameter of from about 0.05 to about 0.5 microns.

10. The method of claim 1 wherein the grafted rubber constitutes from about 15 to 30 weight percent of the weatherable molding resin.

11. A weatherable molding resin composition comprising (A) a matrix polymer selected from the group consisting of copolymers of styrene and acrylonitrile and from 0 to 50 percent based on monomer weight of a monomer selected from the group consisting of methylmethacrylate, N-phenylmaleimide, $N\text{-}C_{1-4}$ alkylmaleimides, maleic anhydride, and mixtures thereof; (B) an impact modifying quantity of a grafted rubber selected from the group consisting of EPDM and acrylate rubbers having grafted thereto in polymerized form styrene, acrylonitrile, and from 0 to 50 percent by weight based on monomer weight of methylmethacrylate, N-phenylmaleimide, $N\text{-}C_{1-4}$ alkylmaleimide, maleic anhydride, or mixtures thereof; and (C) an amount of a polyalkylene glycol having a molecular weight from 200 to 2,000, said amount being sufficient to plasticize said resin composition and to reduce resin discolorization upon exposure to weathering conditions.

12. The composition of claim 11 wherein the polyalkylene glycol is polyethylene glycol.

13. The composition of claim 12 wherein the polyethylene glycol has a molecular weight from 400 to 1600.

14. The composition of claim 11 wherein the molding resin is a styrene-acrylonitrile copolymer containing both grafted EPDM and grafted alkylacrylate rubbers.

15. The composition of claim 11 wherein the polyalkylene glycol constitutes from 0.1 to 5.0 percent of the total weight of said molding resin composition.

16. The composition of claim 11 wherein the polyalkylene glycol constitutes from 0.5 to 3.0 percent of the total weight of said molding resin composition.

17. The composition of claim 11 wherein said molding resin comprises a grafted EPDM rubber having a volume average particle size of from 0.5 to 5.0 microns.

18. The composition of claim 11 wherein said molding resin comprises both a grafted EPDM rubber and a grafted acrylate rubber.

19. The composition of claim 18 wherein the grafted EPDM rubber has a volume average particle size of from 0.5 to 5.0 microns and wherein the grafted acrylate rubber has a volume average particle diameter of from about 0.05 to about 0.5 microns.

20. The composition of claim 11 wherein the grafted rubber constitutes from about 15 to 30 weight percent of the weatherable molding resin.

* * * * *